United States Patent
Dorado et al.

(10) Patent No.: US 12,439,163 B2
(45) Date of Patent: Oct. 7, 2025

(54) MOBILE DEVICE SUPPORT FOR CAPTURE AND SYNTHESIS OF EXTREME LOW-LIGHT VIDEO

(71) Applicant: Google LLC, Mountain View, CA (US)

(72) Inventors: Ignacio Garcia Dorado, Berlin (DE); Shambhavi Punja, Mountain View, CA (US); Peyman Milanfar, Mountain View, CA (US); Kiran Murthy, Mountain View, CA (US); Janne Kontkanen, Mountain View, CA (US); Isaac Reynolds, Mountain View, CA (US); Damien Kelly, Mountain View, CA (US); Alexander Schiffhauer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 18/546,670

(22) PCT Filed: May 19, 2021

(86) PCT No.: PCT/US2021/033111
§ 371 (c)(1),
(2) Date: Aug. 16, 2023

(87) PCT Pub. No.: WO2022/245344
PCT Pub. Date: Nov. 24, 2022

(65) Prior Publication Data
US 2024/0187715 A1 Jun. 6, 2024

(51) Int. Cl.
*H04N 23/70* (2023.01)
*G06T 5/50* (2006.01)
(Continued)

(52) U.S. Cl.
CPC ............. *H04N 23/70* (2023.01); *G06T 5/50* (2013.01); *G06T 5/70* (2024.01); *G06T 5/92* (2024.01);
(Continued)

(58) Field of Classification Search
CPC ...... H04N 23/52; H04N 23/73; H04N 23/741; H04N 23/81; H04N 23/951; H04N 5/2621;
(Continued)

(56) References Cited

U.S. PATENT DOCUMENTS 8,253,844 B2    8/2012 Neidrich
8,411,962 B1    4/2013 Geiss
(Continued)

OTHER PUBLICATIONS

International Search Report and Written Opinion, PCT Application PCT/US2021/033111, mailed Jan. 28, 2022, 14 pages.
(Continued)

*Primary Examiner* — Twyler L Haskins
*Assistant Examiner* — Akshay Trehan
(74) *Attorney, Agent, or Firm* — MCDONNELL BOEHNEN HULBERT & BERGHOFF LLP

(57) ABSTRACT

An example embodiment may involve capturing a sequence of images, wherein there are 4 or more images in the sequence of images, and wherein each of the sequence of images has an exposure length of 4-100 seconds; applying a sliding window over the sequence of images as downsampled, wherein at least 4 images are encompassed within the sliding window', and wherein for each position of the sliding window the applying involves: (i) aligning a set of images within the sliding window, and (ii) merging the set of images as aligned into a video frame; combining video frames generated by way of the sliding window into a video
(Continued)

file; and storing, by the mobile device, the video file in memory of the mobile device.

20 Claims, 8 Drawing Sheets

(51) Int. Cl.
    *G06T 5/70*           (2024.01)
    *G06T 5/92*           (2024.01)
    *H04N 5/262*          (2006.01)
    *H04N 23/52*          (2023.01)
    *H04N 23/73*          (2023.01)
    *H04N 23/741*         (2023.01)
    *H04N 23/81*          (2023.01)
    *H04N 23/951*         (2023.01)

(52) U.S. Cl.
    CPC ......... *H04N 5/2621* (2013.01); *H04N 5/2625* (2013.01); *H04N 23/52* (2023.01); *H04N 23/73* (2023.01); *H04N 23/741* (2023.01); *H04N 23/81* (2023.01); *H04N 23/951* (2023.01); *G06T 2207/20208* (2013.01); *G06T 2207/20221* (2013.01)

(58) Field of Classification Search
    CPC ........... H04N 5/2625; G06T 5/50; G06T 5/70; G06T 5/92; G06T 2207/20208; G06T 2207/20221
    See application file for complete search history.

(56) References Cited

U.S. PATENT DOCUMENTS

| | | |
|---|---|---|
| 8,736,692 B1 | 5/2014 | Wong |
| 9,066,017 B2 | 6/2015 | Geiss |
| 9,077,913 B2 | 7/2015 | Hasinoff |
| 9,087,391 B2 | 7/2015 | Geiss |
| 9,100,589 B1 | 8/2015 | Geiss |
| 9,117,134 B1 | 8/2015 | Geiss |
| 9,118,841 B2 | 8/2015 | Levoy |
| 9,131,201 B1 | 9/2015 | Geiss |
| 9,154,697 B2 | 10/2015 | Geiss |
| 9,172,888 B2 | 10/2015 | Geiss |
| 9,247,152 B2 | 1/2016 | Geiss |
| 9,319,980 B1 | 4/2016 | Lewkow |
| 9,544,574 B2 | 1/2017 | Geiss |
| 9,565,416 B1 | 2/2017 | Lewkow |
| 9,749,551 B2 | 8/2017 | Geiss |
| 9,762,893 B2 | 9/2017 | Barron |
| 9,989,980 B1* | 6/2018 | Urban .................... G03B 17/55 |
| 10,237,527 B2 | 3/2019 | Barron |
| 10,523,875 B2 | 12/2019 | Hasinoff |
| 11,611,697 B2 | 3/2023 | Chen |
| 2006/0221197 A1* | 10/2006 | Jung ....................... H04N 23/65 348/222.1 |
| 2007/0031062 A1* | 2/2007 | Pal ........................ H04N 23/698 382/284 |
| 2008/0192129 A1* | 8/2008 | Walker .................. H04N 23/66 348/231.2 |
| 2012/0002082 A1* | 1/2012 | Johnson ..................... G06T 7/32 348/E9.053 |
| 2012/0262592 A1* | 10/2012 | Rabii ..................... H04N 5/145 348/208.16 |
| 2014/0176745 A1* | 6/2014 | Pajak ................... H04N 5/2621 348/211.99 |
| 2014/0204245 A1* | 7/2014 | Wexler ................ H04N 23/651 348/231.99 |
| 2015/0172539 A1* | 6/2015 | Neglur ................... H04N 23/90 348/222.1 |
| 2016/0360096 A1 | 12/2016 | Holmes |
| 2017/0102676 A1* | 4/2017 | Park ........................ G06F 1/206 |
| 2017/0310901 A1* | 10/2017 | Sheikh .............. H04N 23/6811 |
| 2018/0183998 A1* | 6/2018 | Menachem ............. H04N 1/41 |
| 2020/0160482 A1* | 5/2020 | Kodukula ................. G06T 1/20 |
| 2021/0304359 A1 | 9/2021 | Chen |
| 2021/0385363 A1 | 12/2021 | Klosterman |
| 2022/0070349 A1* | 3/2022 | Watanabe ................. G06T 5/30 |
| 2022/0076018 A1 | 3/2022 | Geiss |
| 2022/0256068 A1 | 8/2022 | Geiss |
| 2023/0209169 A1 | 6/2023 | Jia |

OTHER PUBLICATIONS

Kainz, et al, Astrophotography with Night Sight on Pixel Phones, Google AI Blog, Nov. 26, 2019, 7 pages.
Levoy, et al., Night Sight: Seeing in the Dark on Pixel Phones, Google AI Blog, 14, Nov. 2018, 8 pages.
Liba, et al., Handheld Mobile Photography in Very Low Light, arXiv:1910.11336v1, Oct. 24, 2019, 22 pages.
Wikipedia, Astrophotography, https://en.wikipedia.org/wiki/Astrophotography, downloaded Mar. 21, 2021, 11 pages.
Wronski, et al., Handheld Multi-Frame Super-Resolution, arXiv: 1905.03277v2, Feb. 16, 2021, 24 pages.
Wronski, et al., See Better and Further with Super Res Zoom on the Pixel 3, Google AI Blog, Oct. 15, 2018, 10 pages.

* cited by examiner

FIG. 4

MOBILE DEVICE SUPPORT FOR CAPTURE AND SYNTHESIS OF EXTREME LOW-LIGHT VIDEO

CROSS REFERENCE TO RELATED APPLICATIONS

This application is the U.S. national phase under 35 U.S.C. § 371 of International Application No. PCT/US2021/033111, filed May 19, 2021, the contents of which are hereby incorporated by reference in their entirety.

BACKGROUND

Low-light computational photography involves capturing one or more images with an exposure length that is much longer than would be used in normally-lit environments, merging information from those images, and applying a gain to at least some pixels of the captured or merged image during the process. In this way, an image of a low-light scene can be brightened so that, in some cases, details of the scene are more easily visible. However, such techniques do not work on-device in extreme low-light environments, such when capturing images of the night sky. Further, existing techniques do not support deriving smooth video from sequences of the merged night sky images.

SUMMARY

Astrophotography is a particular application of extreme low-light photography that seeks to capture images of the night sky and celestial objects. This can be done for purposes of collecting scientific data or generating aesthetically pleasing pictures. Current professional astrophotography equipment can involve the use of expensive telescopes and image processing software that is prohibitive for most users and inconvenient to transport to and from capture locations that have a suitably low amount of light pollution. On the other hand, various lower-cost digital cameras or even webcams can be adapted for astrophotography. But current solutions suffer from a number of drawbacks.

First, charge-coupled device (CCD) and other types of image sensors are subject to thermal noise when taking long-exposure images. Thus, as these image sensors heat, image quality degrades. Second, current solutions require off-device post-processing of captured images for purposes of brightening, color-correction, filtering, and ultimately, merging groups of individual images. As a result, developing the final image involves human assistance and this image is typically not available until well after image capture has completed. Third, there are no known solutions for creating videos from the captured images (e.g., of the moon or stars moving in the night sky) on-device during or shortly after image capture.

The embodiments herein address these issues and possibly other limitations by using a mobile device equipped with a camera (e.g., a mobile phone, tablet, or similar device) to capture a series of long-exposure images (e.g., of an extreme low-light environment) over the course of up to several minutes. Either on-the-fly during image capture or afterward, the mobile device merges sets of these captured images based on a sliding window to form a sequence of video frames. These video frames can be streamed to a viewfinder of the mobile device or to a file in its long-term storage. From there, the video frames can be transmitted or otherwise shared as a video stream or file. Advantageously, the mobile device may monitor the temperature of its image sensor and/or other components. If any relevant component of the mobile device is getting too hot or predicted to soon be too hot (and thus possibly introducing thermal noise or other problems), the mobile device can slow down the image capture and/or merging procedures. In this fashion, the impact of thermal noise is reduced. During such embodiments, mobile device may also apply various downsampling, alignment, de-noising, white balance, color correction, brightening, or other techniques in order to improve image (and thus video) quality.

Accordingly, a first example embodiment may involve capturing, by a mobile device, a sequence of images, wherein there are 4 or more images in the sequence of images, and wherein each of the sequence of images has an exposure length of 4-100 seconds. The first example embodiment may also involve applying, by the mobile device, a sliding window over the sequence of images as downsampled, wherein at least 4 images are encompassed within the sliding window, and wherein for each position of the sliding window the applying involves: (i) aligning a set of images within the sliding window, and (ii) merging the set of images as aligned into a video frame. The first example embodiment may also involve combining, by the mobile device, video frames generated by way of the sliding window into a video file. The first example embodiment may also involve storing, by the mobile device, the video file in memory of the mobile device.

A second example embodiment may involve capturing, by a mobile device, a set of m images, each with an exposure length of 4-100 seconds. The second example embodiment may also involve generating, by the mobile device, a sequence of p video frames from the set of m images, wherein each of the p video frames is derived from a respective subset of the set of m images by aligning the respective subset of the m images and merging the respective subset of the m images as aligned into a video frame. The second example embodiment may also involve combining, by the mobile device, the p video frames into a video file in order of the sequence. The second example embodiment may also involve storing, by the mobile device, the video file in memory of the mobile device.

In a third example embodiment, an article of manufacture may include a non-transitory computer-readable medium, having stored thereon program instructions that, upon execution by a computing device, cause the computing device to perform operations in accordance with the first and/or second example embodiment.

In a fourth example embodiment, a computing device may include at least one processor, as well as data storage and program instructions. The program instructions may be stored in the data storage, and upon execution by the at least one processor may cause the computing device to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 depicts a sliding window procedure for generating video frames, according to example embodiments.

DETAILED DESCRIPTION

Figure 1:
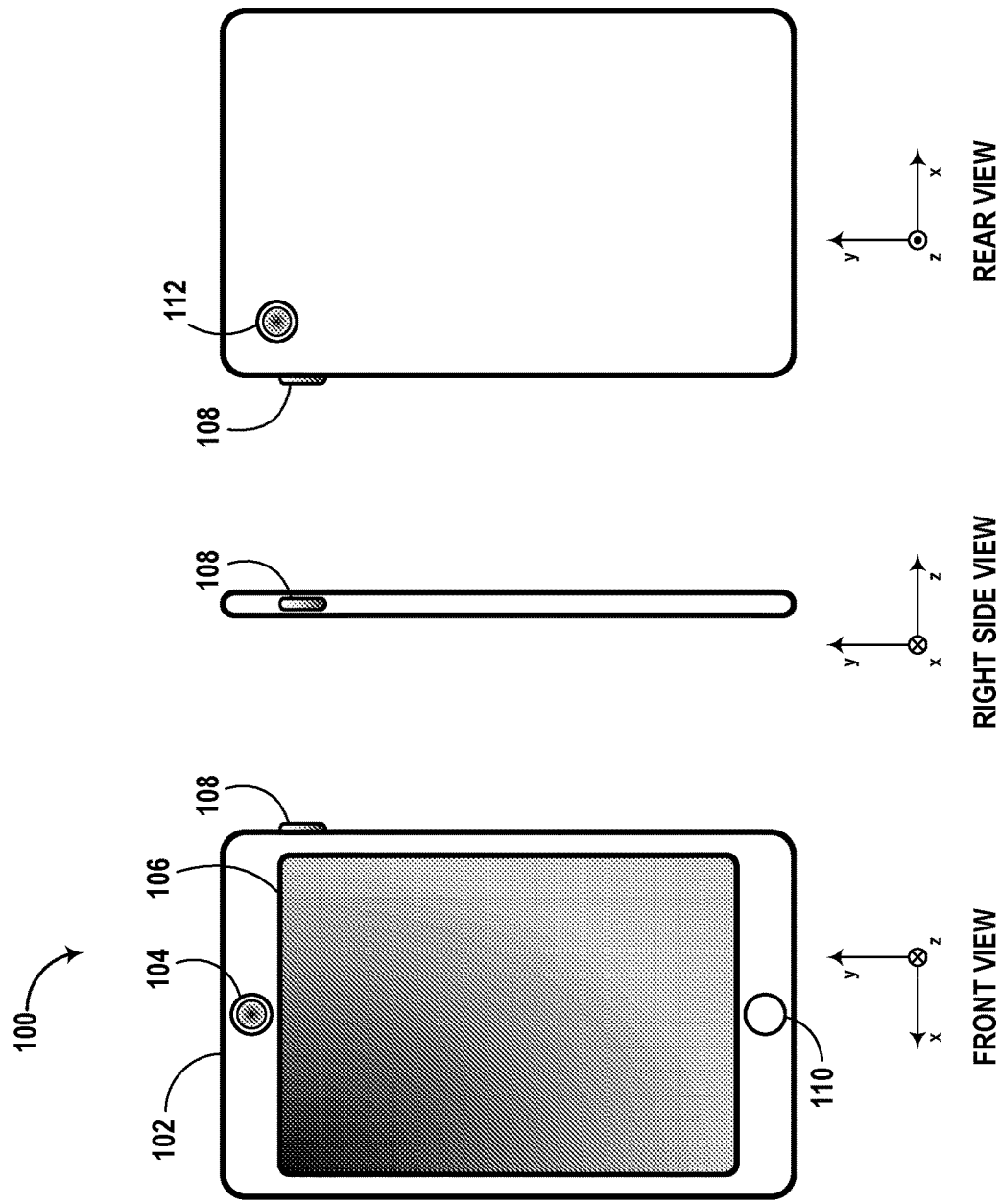
FIG. 1 depicts front, right side, and rear views of a digital camera device, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Depending on context, a "camera" may refer to an individual image capture component, or a device that contains one or more image capture components. In general, image capture components may include an aperture, lens, recording surface, and shutter, as described below.

1. Example Image Capture Devices

As image capture devices, such as cameras, become more popular, they may be employed as standalone hardware devices or integrated into various other types of devices. For instance, still and video cameras are now regularly included in wireless computing devices (e.g., mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data. storage unit (e.g., memory).

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "exposure length," "exposure time," or "exposure time interval" may refer to the shutter length multiplied by the gain for a particular aperture size. Thus, these terms may be used somewhat interchangeably, and should be interpreted as possibly being a shutter length, an exposure time, and/or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Sonic digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct payload images of the current scene may be captured.

Cameras—even analog cameras—may include software to control one or more camera functions and/or settings, such as aperture size, exposure length, gain, and so on. Additionally, some cameras may include software that digitally processes images during or after image capture. While the description above refers to cameras in general, it may be particularly relevant to digital cameras.

As noted previously, digital cameras may be standalone devices or integrated other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure length of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities, It should be understood that computing device 200 may represent a physical camera device such as a digital camera, a particular physical hardware platform on which a camera application operates in software, or other combinations of hardware and software that are configured to carry out camera functions.

Figure 2:
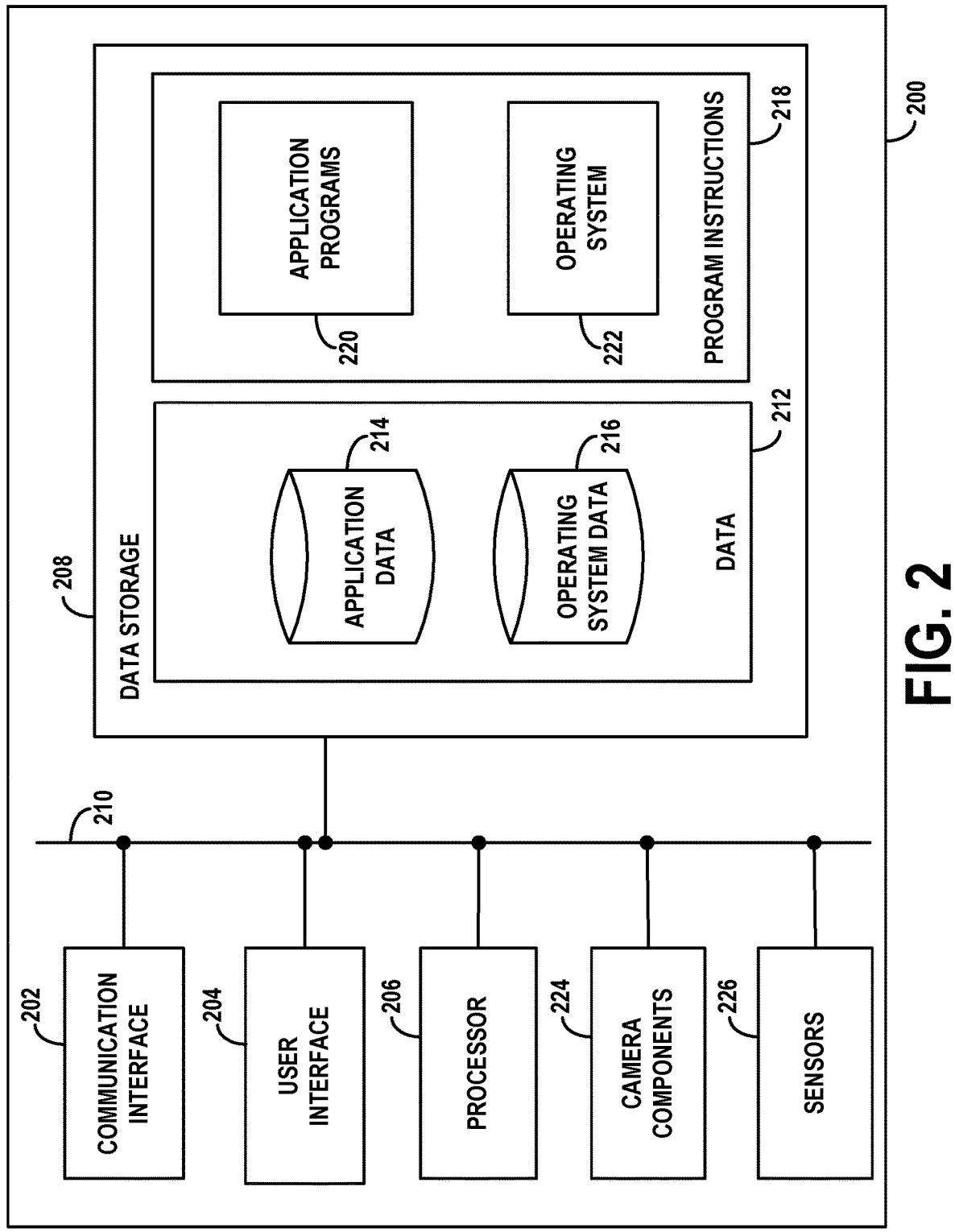
FIG. 2 depicts a block diagram of a computing device with image capture capability, according to example embodiments.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate packet-switched communication, such as Internet protocol (IP) or other packetized communication. For instance, communication interface 202 may include a chipset and antenna arranged for wireless communication with a radio access network or an access point, Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., 3GPP Long-Term Evolution (LTE)) or various 5G technologies). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 206 may comprise one or more general purpose central processing units (CPUs)—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Sensors 226 may include one or more temperature and/or power sensors that can determine the temperature and/or power usage of processor 206, camera components 226, and/or other components. Access to data from sensors 226 may be made available by way of application programs 220 and/or operating system 222, for example.

2. Image Capture and Processing Techniques

In the embodiments described below, a "captured image" refers to an image recorded by camera components using a single exposure, the length of which may vary. A "photograph" on the other hand refers to one or more captured images that have been aligned, merged, and/or otherwise processed to form an image that is more suitable for scientific, professional, or personal use. Further, an "image capture software application" may be a program or "app" executable to control camera components and process captured images.

An ongoing challenge with digital photography, especially when images are captured using mobile devices (e.g., mobile phones, tablets, etc.), is adapting to low-light environments. Such captured images are typically subject to image noise, which may take on the appearance of random variations in brightness from pixel to pixel.

For cameras on mobile devices, which have small lenses and sensors, a source of noise is the natural variation of the number of photons entering the lens (shot noise), Every image capture device suffers from shot noise, and it would be present even if the image sensor electronics were perfect. However, these electronics are not perfect, and also introduce random errors when converting the electronic charge resulting from light hitting each pixel into one or more numbers representing the brightness and/or colors of the pixel (read noise).

These and possibly other sources of noise contribute to the overall signal-to-noise ratio (SNR), which represents how much the captured image stands out from these variations in brightness, Fortunately, SNR rises with the square root of exposure length (or faster), so taking a longer exposure produces a cleaner picture. But with mobile devices that are typically handheld, it is difficult to remain still long enough for the camera to take a long exposure, not to mention that the object being photographed might not remain still either.

Variations of high-definition range (HDR), a computational photography technology, improves this situation by capturing a burst of images, aligning the images in software, and merging them together. This improves the ability to photograph scenes that exhibit a wide range of brightnesses (like sunsets or backlit portraits). Further, merging multiple captured images also reduces the impact of shot noise and read noise, so it improves SNR in low-light environments. To keep the resulting images sharp even if the mobile device is subject to some movement (e.g., shaking) or if the object moves, a series of short exposures can be used. During the merging of these captured images, ones for which a sufficient alignment cannot be obtained may be discarded. This allows HDR to produce sharp merged photographs from these images.

Alignment and merging may be performed with respect to a reference image, chosen as the sharpest image in the burst. A tile-based alignment algorithm may be performed in a coarse-to-fine fashion on three or tour level Gaussian pyramids of the raw input. In some implementations, the size of the tiles for alignment is increased as the noise level in the image rises, at the cost of slightly increased computation for larger tile sizes, Square tiles of 16, 32, and 64 pixels, depending on the noise level, may be used. For example, in a well-lit indoor setting, the size of the alignment tiles may be 16 pixels while in the dark it may be 64 pixels. Merging may involve performing a weighted average in the Fourier domain on a tile-by-tile basis. Images that fail the alignment and merging process (e.g., that would result in a combined image that is too noisy) may be discarded.

Since capturing and merging multiple images produces cleaner photographs in low light, it is desire to determine whether HDR could be used to merge dozens of these captured images. Doing so would effectively allow the camera to "see in the dark" and take photographs in extreme low-light environments, ones that appear to be almost pure black to the human eye.

TABLE 1

| Lux | Description |
| --- | --- |
| 30,000 | Sidewalk lit by direct sunlight |
| 10,000 | Sidewalk on a clear day, but in shadow |
| 1,000 | Sidewalk on an overcast day |
| 300 | Typical office lighting |
| 150 | Typical residential desk lighting |
| 50 | Typical restaurant |
| 20 | Restaurant with atmospheric lighting |
| 10 | Minimum for finding matching socks in a drawer |
| 3 | Sidewalk lit by street lamps |
| 1 | Minimum light needed to read a newspaper |
| 0.6 | Sidewalk lit by full moon |
| 0.3 | A human cannot visually locate objects on a floor |
| 0.1 | A human requires a flashlight to physical navigate a location |

The light level of a scene is measured in terms of the amount of light reaching the area of a surface. Lux defines such a measurement in lumens per meter squared. Table 1 provides descriptive examples of lux values.

Mobile device cameras that create photographs from single captured images begin to struggle at 30 lux. Mobile device cameras that use align and merge procedures with several captured images (e.g., variations of HDR) can perform well down to 3 lux, but in dimmer scenes require flash. In order to operate in extreme low-light environments, such as between 0.3 and 3 lux, further modifications to HDR need to be made so that more photons are captured.

One way of doing so is to increase the exposure length of captured images. While increases SNR and leads to cleaner photographs, it unfortunately introduces two problems related to shutter lag and motion blur.

Mobile device cameras may default to using a zero-shutter-lag (ZSL) image capture protocol, which intrinsically limits exposure time. For example, as soon as the user opens the image capture software application, it causes the camera to begin capturing images and storing them in a circular butler that constantly erases old captured images to make room for new ones. When the user activates (e.g., presses) the shutter button, the camera provides the most recent set of frames (e.g., 9-15) to the HDR pipeline. While this is aesthetically pleasing to the user because he or she is able to capture the exact desired moment, displaying these same images on the viewfinder to help the user aim the camera, limits exposures to at most 66 ms no matter how dim the scene. Thus, for very dim scenes where longer exposures are necessary, a positive-shutter-lag (PSL) protocol should be used. PSL waits until after the user activates the shutter button before it starts capturing images. Using PSL means that the user should remain still for a short time after activating the shutter, but allows the use of longer exposures that improve SNR at much lower brightness levels.

Motion blur, due to the user's hands shaking or moving objects in the scene, also places limits on exposure length. Optical image stabilization can reduce the effects of shaking for moderate exposure lengths (up to about 125 ms), but does not help with longer exposures or with moving objects. To further mitigate motion blur, motion metering can be used. This may involve using an optical flow technique to measure recent scene motion and select an exposure length that reduces blur. For some mobile device cameras, this can increase extreme low-light exposure lengths up to 333 ms. If the mobile device is being physically stabilized (held against a wall or by way of a tripod, for example), the exposure length can be increased to as much as one second. In addition to varying per-image exposure length, the number of images captured can also be varied (e.g., 6 if the mobile device is on a tripod and up to 15 if it is handheld). These limits mitigate user fatigue. Thus, depending on mobile device, camera hardware, shaking, scene motion, and scene brightness, these embodiments can capture 15 images of 66 ms exposure (or less) each, 6 images of 1 second exposure each, or anything in between.

In addition to increasing exposure lengths (and thereby increasing the photons received), alignment and merging techniques can also be adapted for extreme low-light environments. Averaging the pixel values in a set of captured images of the same scene can be used to reduce noise, and is referred to as "exposure stacking." The challenge with doing so is aligning the captured images when they were taken by a camera of a handheld mobile device (and thus would be subject to shaking). In low-light scenarios, more emphasis may be placed on detecting and rejecting misaligned parts of images, even if the scene is noisy. Some embodiments may involve capturing images continuously, aligning and merging them in real time at low resolution, and displaying the merged result, which steadily becomes cleaner as more captured images are aligned and merged in this fashion. Alternatively, the aligning and merging can take place without the displaying step, in which case the user is able to view the resulting image by selecting it after the aligning and merging is complete.

Further, measures can be taken to improve the performance of automatic white balancing (AWB) in extreme low-light environments. As background, humans are good at color constancy—perceiving the colors of things correctly even under colored illumination or when wearing sunglasses. But that process breaks down when a photograph is taken under one kind of lighting and viewed under different lighting—the photograph will appear tinted to the human eye. To correct for this perceptual effect, mobile devices may perform AWB to adjust the colors of images to partially or completely compensate for the dominant color of the illumination (sometimes called color temperature). This effectively shifts the colors in the image to make it seem as if the scene was illuminated by neutral (white) light.

But white balancing is what mathematicians call an ill-posed problem. If a captured image of a lake is blue, it can be difficult to determine whether the lake itself was blue or the lake was some other color illuminated by a blue sky. This ambiguity makes white balancing hard. Existing AWB algorithms work reasonable well in most scenarios, but in very dim or strongly colored lighting, they may not be able to discern between the color of the object and illumination of the scene.

To solve these problems, a machine-learning-based AWB algorithm was developed. The algorithm was trained to discriminate between a well-white-balanced image and a poorly balanced one. When a captured image is poorly balanced, the algorithm can suggest how to shift its colors to make the illumination appear more neutral. Training the algorithm involved photographing a diversity of scenes mobile devices, then hand-correcting their white balance while looking at the photo on a color-calibrated monitor. Nonetheless, this machine-learning-based AWB algorithm is not a required component of the embodiments herein.

Moreover, there is another challenge when taking photographs of scenes so dark that they cannot be clearly distinguished by the human eye. Particularly, in very dim lighting humans stop seeing in color, because the cone cells in our retinas stop functioning, leaving only the rod cells, which cannot distinguish between different wavelengths of light and have low spatial acuity. In other words, scenes still have color at night but we cannot see these colors. Thus, when presented with a photograph of a scene at night, a human expects at least part of that scene to be dark.

But that is not what happens when exposure lengths are increased. For example, if an image with a very long exposure of several minutes is captured or if a number of images are captured with shorter exposure lengths and then aligned and merged, night can be made to look like day. In other words, shadows will have details and the scene will be colorful and sharp. With such long exposures, stars can be visible in the sky, but the sky is blue and the grass is green while the moon casts shadows look like shadows cast by the sun. While this is an interesting effect, it is not always what the user wants or expects. Particularly, someone viewing the photograph may be confused about when it was captured (e.g., night or day).

To rectify this situation, tone mapping with an S-curve is employed. Tone mapping adjusts the luminance of pixels in a captured image to more clearly represent the large dynamic range in the real world. The S-curve may be used to give pixels in a middle luminance range about a 10-20% enhanced contrast when compared to luminances at either end of the range. In other words, pixels with moderate luminances (which are to ones most likely to represent features of interest to the viewer) are enhanced while dark and bright pixels are not enhanced or only slightly enhanced. The result is that features of interest (e.g., buildings, faces) are sharp and colorful while the night sky remains dark.

3. Specific Astrophotography Techniques

With some experimentation, the above techniques can be adapted for astrophotography—capturing images of the night sky with a mobile device. But a number of other techniques and settings have been found to further improve astrophotos.

A. Exposure Lengths

In particular, high quality night sky photographs require exposure lengths of several minutes. This is unlikely to work well with a handheld mobile device due to shaking and lack of user patience. In practice, the mobile device should be placed on a tripod, leaned against a rock, or braced against some other object to hold it steady.

Further, photographs mixed scenes (night sky and landscape) should take motion in the scene into account. Trees sway in the wind, clouds drift across the sky, and the moon and the stars rise in the east and set in the west. While viewers will tolerate motion-blurred clouds and tree branches in a photograph that is otherwise sharp, motion-blurred stars look like short line segments. To mitigate this phenomenon, each image is captured with an exposure time short enough to make the stars look like points of light. From experimentation, it was determined that for images of night skies, the per-capture exposure time should ideally not exceed about 20-30 seconds. But shorter or longer exposure lengths could be used.

Additionally, while the number of captured images that can be aligned and merged into a single photograph is limited by technical concerns, it is more tightly constrained by the photographer's patience. Few users are willing to wait more than about four minutes for a picture, so the total exposure time may be limited to approximately four minutes. In other words, for a per-capture exposure time of 16 seconds, at most 15 images are captured, aligned and merged. Exposure lengths of 16 seconds allow enough light to be captured to produce recognizable images. But in situations where user patience is not a constraint, the total exposure time can be greater than four minutes.

Other combinations are possible. Thus shorter or longer exposure lengths as well as total exposure times may be supported for purposes of experimentation. For example, with a per-capture exposure time of 12 seconds, at most 20 images are captured, aligned and merged.

B. Warm and Hot Pixels

Residual current causes certain types of image sensors e.g., CMOS image sensors) to record a spurious signal, as if the pixels were exposed to a small amount of light even when no actual light is present. The effect is negligible when exposure lengths are short, but it becomes significant with multi-second exposure lengths. Due to unavoidable imperfections in the image sensor's silicon substrate, some pixels exhibit higher residual current than their neighbors. In a captured image, these "warm pixels," as well as defective "hot pixels," are visible as tiny bright dots.

Warm and hot pixels can be identified by comparing the values of neighboring pixels within the same captured image, and across a sequence of images captured image for a photograph, to detect outliers. Once an outlier has been detected, it can be concealed by replacing its value with the average of its neighboring pixels. Since the original pixel value is discarded, there is a loss of image information, but in practice this does not noticeably affect image quality.

C. Viewfinder Usage

Mobile device screens are used as electronic viewfinders. The image capture software application captures a continuous stream of images that are displayed as a live video in order to aid with composition (the centering of the camera on objects of interest). The images are simultaneously used by the application's autofocus, auto exposure, and AWB features.

To feel responsive to the user, the viewfinder is updated at least 15 times per second, which limits the viewfinder frame exposure time to 66 milliseconds. This makes it challenging to display a detailed image in low-light environments. At light levels below the rough equivalent of a full moon or so, the viewfinder becomes mostly gray. In astrophotography uses, this may result in the viewfinder showing a few bright stars, but none of the landscape. Thus composition becomes difficult.

To assist in framing a scene in extremely low light, a post-shutter viewfinder may be used. After the shutter button has been pressed, each long-exposure image is displayed on the screen as soon as it has been captured. With exposure lengths up to 16 seconds, these images have collected almost 250 times more light than the regular viewfinder images, allowing the user to easily see image details as soon as the first image has been captured. The composition can then be adjusted by moving the mobile device while the exposure continues. Once the composition is correct, the capture sequence can be stopped, and a second capture sequence in which all images have the desired composition can begin.

In some embodiments, generated images and/or video frames may be displayed on the viewfinder in real time. This display may be delayed slightly in order to account for processing time of the raw images into video frames.

D. Autofocus

Autofocus attempts to ensure that the images captured are sharp. In normal operation, the incoming viewfinder frames are analyzed to determine how far the lens must be from the sensor to produce an in-focus image. But in very low light, the viewfinder frames can be so dark and grainy that autofocus fails due to lack of detectable image detail. When this happens, post-shutter autofocus may be used.

With this feature, after the user presses the shutter button, the mobile device captures two images with exposure lengths up to one second, long enough to detect image details even in low light. These images are used only for autofocus purposes and do not contribute directly to the photograph generated from captured images.

Even though using long-exposure images for autofocus leads to consistently sharp images at light levels low enough that the human visual system cannot clearly distinguish objects, sometimes it gets too dark even for post-shutter autofocus. In this case the mobile device may effectively focus at infinity. To mitigate, the image capture software application may provide manual focus controls so that the user can set the focus as desired.

E. Night Sky Processing

When images of very dark environments are viewed on a screen, they are displayed with more brightness than the original scenes. This can change the viewer's perception of the time of day when the images were captured. As noted above, the viewer expects the night sky to be dark. If a picture taken at night shows a bright sky, then it appears as if it were daytime scene perhaps with unusual lighting. This effect can be countered by selectively darkening the sky in photos of low-light scenes.

To do this, machine learning can be used to detect which regions of an image represent sky. An on-device convolutional neural network was trained with over 100,000 images that were manually labeled by tracing the outlines of sky regions, and identifying each pixel in a photograph as "sky" or "not sky." Using this neural network, sky can be detected in newly captured images with a high degree of accuracy. Detected sky is then darkened, and sky-specific noise reduction and contrast adjustments can be made to make certain celestial objects more prominent.

4. Example Astrolapse Features

The term "astrolapses" refer to videos of the night sky made from sequences of captured images. These videos show the movement of celestial objects across the sky. Prior astrolapse techniques required using tracking mounts as well as of manual processing of captured images. Use of tracking mounts involves a fair degree of user sophistication (e.g., employing a DSLR camera with motion control to track a random direction off the normal equatorial axis). Further, off-device manual processing means there would be a significant delay between when images are captured and the video file is ready, and that the quality of the video file would be subjectively determined by user creating it. Moreover, at least some of the advanced techniques described above might not be available to users (e.g., the machine learning features).

Thus, the astrolapse embodiments herein improve upon the state of the art by providing video file generation on-device, possibly on-the-fly, with advanced image processing techniques. The user need only set up a mobile device for astrolapses and then wait a few minutes for the video to be ready. The video can be played out on the same device. In some cases, the mobile device could preview or play out the generated video as at least part of the video is being generated. Nonetheless, possible embodiments include transmitting captured images to another device for processing into astrolapse videos.

Figure 3:
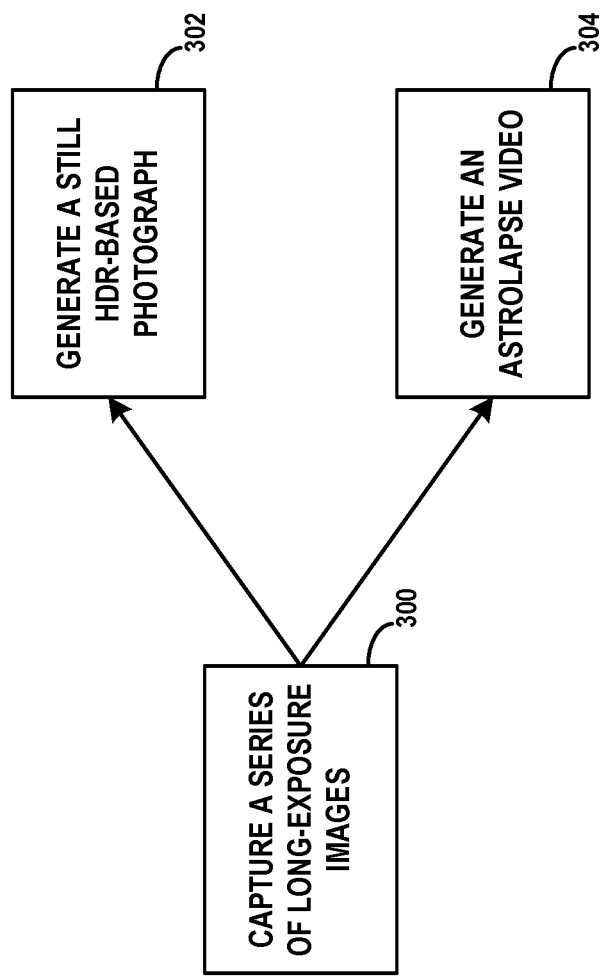
FIG. 3 depicts image capture and processing, according to example embodiments.

FIG. 3 depicts image capture and processing in accordance with example embodiments. The image capture and processing may be carried out by a mobile device, embodied by digital camera device 100 and/or computing device 200. For example, an image capture software application may be one of application programs 220 and may control camera components 224.

At block 300, the image capture software application may instruct camera components 224 to capture a series of long-exposure images, e.g., 8-20 images with exposure lengths of 4-100 seconds each, or 1-100 images with exposure lengths in a similar range. In various embodiments, exposure lengths of 6-30 seconds, 8-24 seconds, 12-20 seconds, or other values may be used. These captured images may be stored temporarily for further processing.

At block 302, the image capture software application may generate a still HDR-based photograph from the captured images. Any of the HDR or astrophotography features described above may be used to do so, including aligning, merging, de-noising, sharpening, and AWB. The resulting photograph may be written to long-term storage (e.g., non-volatile memory) for later viewing, transmission to other devices (e.g., sharing), and/or further processing. The operations of block 302 are largely as described above.

At block 304, the image capture software application may generate an astrolapse video from the captured images. Any of the features described above may be used to do so, including aligning, merging, de-noising, sharpening, and AWB. In particular, and as described below, the video may consist of a number of video frames, each generated by way of aligning and merging several sequentially-captured images.

Figure 4:
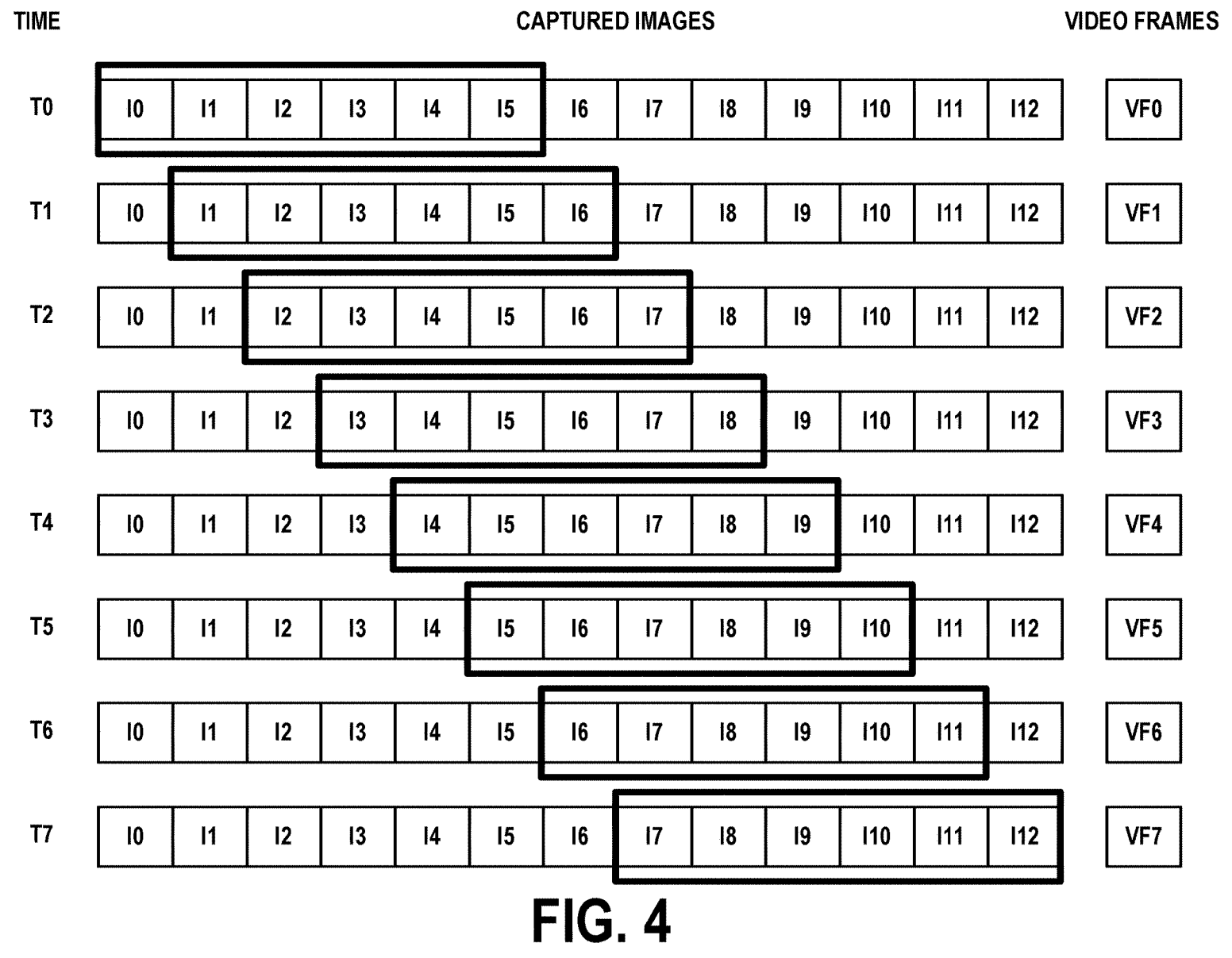

The operations involving blocks 302 and 304 may occur at different times or at least in part in parallel. Further, they may involve different image processing pipelines, though each of these pipelines may rely on or make use of common features e.g., aligning, merging, de-noising, sharpening, and AWE), FIG. 4 depicts generation of video frames using a sliding window in accordance with example embodiments. It is assumed that the image capture software application has instructed the camera components to capture a sequence of images, I0, I1, I2, . . . , I12. In accordance with experimental testing, each image in the sequence may have an exposure length of 12-16 seconds, but longer or shorter exposures may be used. While these images may be captured sequentially (e.g., capture for image n+1 begins immediately after capture for image n ends), there may be some delay between sequential image captures. It is also assumed that a sliding window sized at 6 images is used, but sliding windows may be sized to cover more or fewer images.

At time T0, a sliding window is positioned to cover images I0, I1, I2, I3, I4, and I5. The image capture software application uses the images within this sliding window to generate video frame VF0. Doing so may involve the alignment and merging of images I0, I1 I2, I3, I4, and I5. Other image processing techniques may also be applied. Similarly, at time T1, the sliding window is positioned to cover images I1, I2, I3, I4, I5, and I6. The image capture software application uses the images within this sliding window to generate video frame VF1, again using alignment, merging, and other techniques as needed or desired. This process continues until, at time T7, the sliding window is positioned to cover images I7, I8, I9, I10, I11, and I12. The image capture software application uses the images within this sliding window to generate video frame VF7, again using alignment, merging, and other techniques as needed or desired.

In general, for a sequence of m captured images and a window size of w, where 2<w≤m, the sliding window may begin in a position to cover the first w images and then shift m−w+1 times until it is positioned to cover the last w images. In each of these positions, a video frame is generated from the images covered by the window. These video frames may be combined in order to form a video (e.g., as an MP4 video file) depicting the movement of objects in the captured scene.

The sliding window procedures depicted in FIG. 4 can be implemented in at least two ways. In one way, all of images I0, I1, I2, . . . , I12 are captured and then the sliding window is applied to these images as described above. In another way, once a sliding window of images are captured, the sliding window may be applied to these images in parallel with the capture of further images. For example, once images I0, I1, I2, I3, I4, and I5 are captured, the sliding window may be applied to these images to generate video frame VF0 while image I6 is being captured. Likewise, once image I6 is captured, the sliding window may be applied to images I1, I2, I3, I4, I5, and I6 to generate video frame VF1 while image I7 is being captured.

In some embodiments, the captured images are downsampled and then the video frames are generated from the downsampled images. For example, each captured image I0, I1, I2, . . . , I12 may be downsampled by a factor of 2, which reduces the size of the captured images to one-quarter of their original sizes. This downsampling may be implemented by identifying non-overlapping 2×2 blocks of pixels in the original images. Each 2×2 block may be replaced by a single pixel with one or more pixel values based on averaging the respective pixel values of the four pixels in the 2×2 block. While doing so reduces the resolution of the resulting video, in practice this reduction is not significantly noticeable to users, and processing the downsampled images saves battery life as compared to processing the non-downsampled images.

A. Compensating for Device Temperature

As noted above, thermal noise will increase as the temperature of the image sensor grows hotter. If the viewfinder is used during image capture, this problem is exacerbated, as viewfinder operation can dramatically increase the heat generated by the mobile device. Further, a mobile device that grows too hot in general may automatically slow down its processing to allow heat to dissipate from the CPU and/or GPU.

Normal operating temperature for a mobile device is around 40 degrees Celsius (as measured at its image sensor, CPU, or GPU). During image capture, its temperature may be from about 40-80 degrees Celsius, with higher peaks. This is enough to cause thermal noise as well as to cause slowdowns in processing. Therefore, it may be advantageously to adapt image capture techniques to take temperature into account.

It has been observed that it can take approximately 15 seconds for a mobile device operating at a temperature of 80 degrees Celsius while performing image capture to drop to 40 degrees Celsius once the image capture is no longer being performed. Therefore a pause of approximate 15 seconds when temperature exceeds a predetermined threshold (e.g., 80 degrees Celsius) may be warranted. The recommended length of this pause, however, may vary (e.g., from 5 to 30 seconds) depending on the heat profile of the mobile device and its hardware configuration.

In any event, in order to mitigate thermal noise and other heat-related difficulties, the image capture software application may be configured to use sensors to obtain the temperature of various camera components (e.g., the image sensor), its CPU, or its GPU on a periodic basis or from time to time. Each of these components may support a low-level system call interface through which their temperatures can be programmatically obtained.

Thus, for example, the image capture software application can check the temperature of the image sensor after the exposure completes for each image capture. If the temperature of the image sensor exceeds a predetermined threshold (e.g., 60, 70, or 80 degrees Celsius), the image capture software application may pause image capture procedures for a period of time (e.g., 5-30 seconds), giving the image sensor a chance to cool before the next image is captured.

Alternatively, a temperature prediction may be made and the image capture procedure may be modified based on this prediction. For instance, if the exterior temperature of the mobile device is 40° C. and the capturing is scheduled to last for at least 20 minutes, the temperature mitigation techniques may be initiated proactively.

Figure 5:
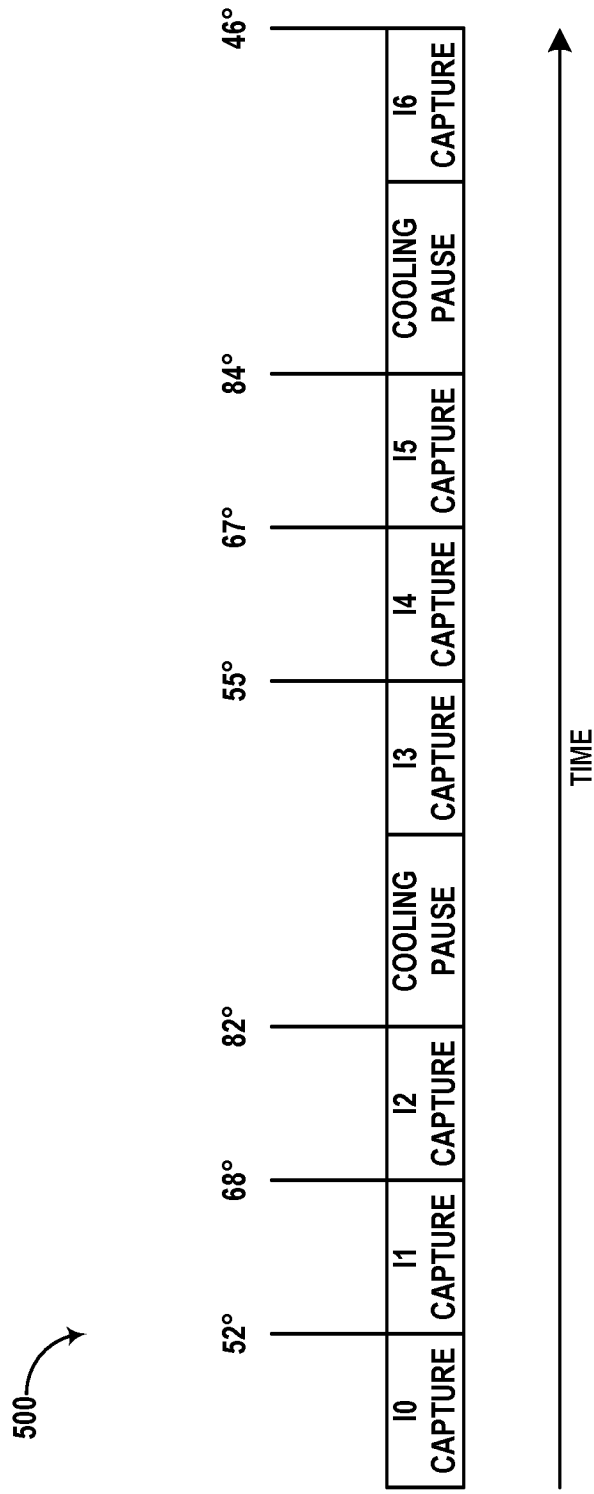
FIG. 5 depicts image capture procedures with temperature based cooling pauses, according to example embodiments.

FIG. 5 depicts such a procedure. Timeline 500 shows a series of image captures (I0 capture, I1 capture, and so on) taking place sequentially. At or about the end of each capture, the image capture software application checks the temperature of the image sensor. If it exceeds the predetermined threshold of 80 degrees Celsius, the image capture software application will perform a cooling pause and wait a few seconds before resuming image capture. The cooling pause may involve active cooling (e.g., running a fan to dissipate heat) or passive cooling (e.g., idling the processor or GPU, turning off the screen, etc.).

As shown, the temperatures of 52 and 68 degrees Celsius, respectively measured after the I0 capture and I1 capture, are lower than this threshold. Therefore image capture continues in both of these cases. But after the I2 capture, the temperature is 82 degrees Celsius, which is above the threshold. In response, the image capture software application performs a cooling pause before resuming image capture procedures with the I3 capture. A similar cooling pause occurs in response to the temperature being above the threshold (at 84 degrees Celsius) after the I5 capture.

In timeline 500, the exposure lengths for each image capture may be 12 seconds, while the cooling pause may be 15 seconds. But other durations for each may be possible. Further, the temperature measured may be that of the image sensor, other camera components, the CPU, the GPU, or some combination thereof (e.g., a maximum or average). The cooling pause may be of a fixed duration, or may continue until the temperature is measured to be below a further threshold (e.g., 40 or 45 degrees Celsius) indicating that the mobile device has sufficiently cooled to continue image capture with reduced thermal noise.

In some embodiments, detection of a temperature exceeding the threshold may also pause or slow down imagine processing procedures such as those shown in FIG. 4. For example, if alignment and merging of captured images is taking place in parallel to image capture, the alignment and merging may also be paused when the detected temperature is above the threshold in order to assist with overall device cooling. The pause may take the form of delaying movement of the sliding window into the next position and the associated processing of images within that position of the sliding window.

Alternatively or additionally, the image capture software application may be configured to capture no more than a maximum number of long-exposure images per minute (e.g., 2 or 3) in order to control device temperature. This may not require that a temperature be explicitly measured.

B. Retiming

The exposure lengths for individual image captures may be 4-100 seconds, with exposure lengths of 12-15 seconds having been established as working reasonably well in practice. In various embodiments, exposure lengths of 6-30 seconds, 8-24 seconds, 12-20 seconds, or other values may be used. When captured images within sliding windows are aligned and merged into video frames, sequential video frames represent the scene at points in time that are approximately the exposure length apart. Given the practicable values fur exposure length in astrolapse uses, the resulting video can appear choppy. In order to mitigate this effect, retuning can be used to extrapolate intermediate video frames between sequential video frames. The result is smoother video.

Figure 6:
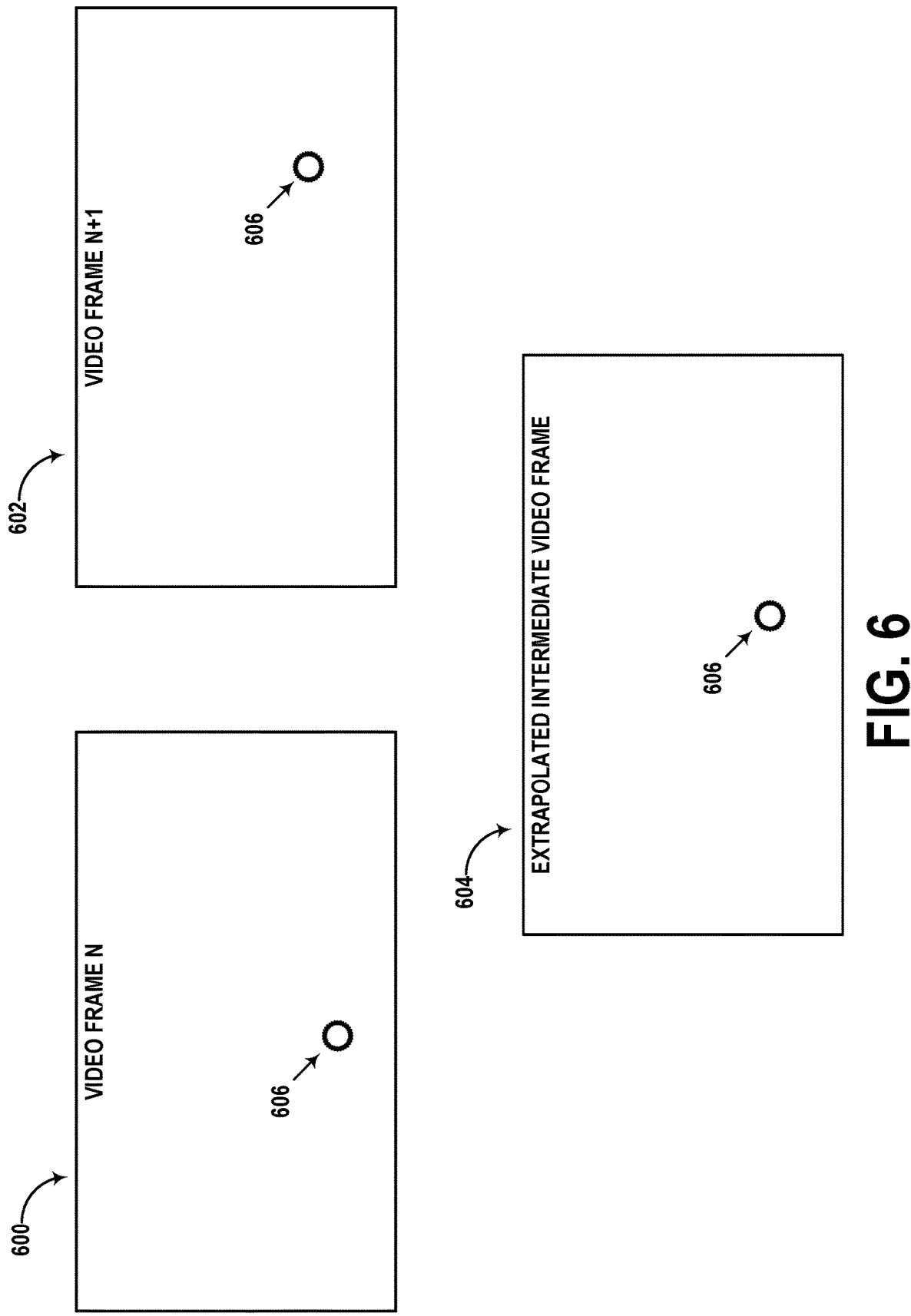
FIG. 6 depicts video frame extrapolation, according to example embodiments.

FIG. 6 depicts such extrapolation. Block 600 represents video frame N, and block 602 represents video frame N+1. It is assumed that these are two sequential video frames of a night sky generated by using the processes described herein. Video frame N contains celestial object 606 (e.g., a star) in a first position in the night sky and video frame N+1 contains celestial object 606 in a second position in the night sky. The movement and size of celestial object 606 is exaggerated for purpose of illustration.

When the movement of celestial object 606 between two sequential video frames is of a large enough extent, this movement may make celestial object 606 appear to "jump" from the first position to the second position in the generated video. In order to mitigate this effect, retuning may be used to interpolate an intermediate video frame.

This interpolation may involve detecting objects that have moved between video frame N and video frame N+1. Doing so may involve edge detection, object identification from detected edges, and determining when such an identified object has moved beyond a threshold distance. When such movement is detected, an intermediate video frame may be generated from video frame N and video frame N+1 in which the moved object is placed at an intermediate location between where it appears in video frame N and video frame N+1. The non-moving background of the intermediate video frame may be copied from video frame N or video frame N+1, or calculated based on pixel value averages from these video frames.

For example, if the extrapolated video frame is intended to represent the scene halfway in time between video frame N and video frame N+1, the celestial object may be extrapolated to be at the midpoint of its coordinates in video frame N and video frame N+1. In other words, if the celestial object is at position $(x_1, y_1)$ in video frame N and at position $(x_2, y_2)$ in video frame N+1, the celestial object may be extrapolated to be at position $$\left(\frac{x_1 + x_2}{2}, \frac{y_1 + y_2}{2}\right)$$

in the extrapolated video frame. This is shown in block 604. If the extrapolated video frame is intended to represent the scene at some other point in time between video frame N and video frame N+1, the denominator of the midpoint equation can be adjusted accordingly. Alternatively, since the movement of a celestial object from the perspective of one on Earth follows an arc rather than a straight line, the position of the celestial object along this arc may be interpolated.

Further, since there may be multiple celestial objects that appear to be moving between video frames, these calculations may take place independently for each moving object that is identified.

C. Very Long Astrolapses

In some cases, long-term (e.g., "all night") astrolapses could be generated. For example, a device could capture 15 frames for 4 minutes, and then merge these frames to generate a single video frame. Thus, if the goal is to capture 50 video frames for 10 hours, the device could capture 15×50=750 video frames, where each video frame is created every 12 min from the 15 frames captured in the previous 4 minutes. This differs with the sliding window approach in that the images making up each video frame do not overlap, and there is idle time between each video frame generation, allowing for device cooling.

5. Example Operations

Figure 7:
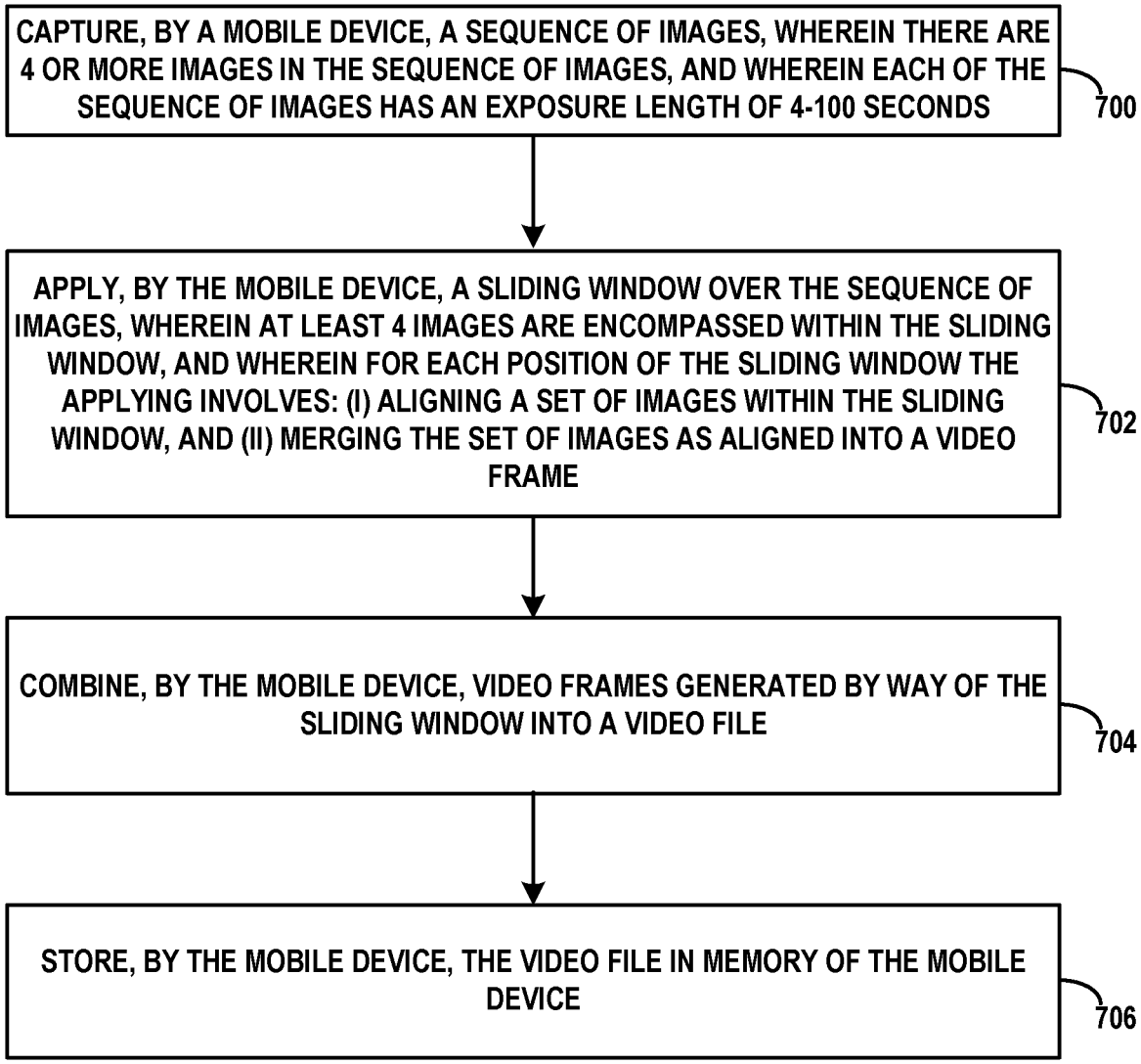
FIG. 7 is a flow chart, according to example embodiments.

FIG. 7 is a flow chart illustrating an example embodiment. This embodiment may be carried out by a computing device, such as digital camera device 100 as exemplified by computing device 200. However, one or more aspects of this embodiment can be carried out by other types of devices or device subsystems, such as a mobile device or other device containing or controlling a camera. Further, this embodiment may be combined with or may incorporate any aspect or feature disclosed in this specification or the accompanying drawings.

Block 700 may involve capturing, by a mobile device, a sequence of images, wherein there are 4 or more images in the sequence of images, and wherein each of the sequence of images has an exposure length of 4-100 seconds. In some cases, fewer images may be in the sequence of images. In various embodiments, exposure lengths of 6-30 seconds, 8-24 seconds, 12-20 seconds, or other values may be used.

Block 702 may involve applying, by the mobile device, a sliding window over the sequence of images, wherein at least 4 images are encompassed within the sliding window, and wherein for each position of the sliding window the applying involves: (i) aligning a set of images within the sliding window, and (ii) merging the set of images as aligned into a video frame.

Block 704 may involve combining, by the mobile device, video frames generated by way of the sliding window into a video file.

Block 706 may involve storing, by the mobile device, the video file in memory of the mobile device.

Some embodiments may involve, prior to applying the sliding window, downsampling the sequence of images by at least a factor of 2. In some embodiments, the downsampling and applying overlap at least in part with the capturing.

In some embodiments, capturing the sequence of images comprises: measuring a temperature of a camera component of the mobile device; determining that the temperature exceeds a predetermined threshold; and possibly in response to determining that the temperature exceeds the predetermined threshold, delaying capture of a subsequent image in the sequence of images. The camera component may be an image sensor.

The measuring may take place during or after capture of an nth image in the sequence of images, and wherein the subsequent image is an (n+1)th image in the sequence of images.

Delaying capture of the subsequent image may comprise delaying capture of the subsequent image for a predetermined amount of time. Alternatively or additionally, delaying capture of the subsequent image may comprise delaying capture of the subsequent image until the temperature no longer exceeds the predetermined threshold.

In some embodiments, applying the sliding window comprises: measuring a temperature of a camera component of the mobile device; determining that the temperature exceeds a predetermined threshold; and possibly in response to determining that the temperature exceeds the predetermined threshold, delaying movement of the sliding window to a next position. The camera component may be an image sensor.

Delaying movement of the sliding window to the next position may comprise delaying movement of the sliding window for a predetermined amount of time. Alternatively or additionally, delaying movement of the sliding window to the next position comprises delaying movement of the sliding window until the temperature no longer exceeds the predetermined threshold.

In some embodiments, combining the video frames generated by way of the sliding window into the video file comprises: identifying a first video frame and a second video frame that were sequentially generated; detecting one or more objects that have different positions in the first video frame and the second video frame; generating an intermediate video frame that is temporally between the first video frame and the second video frame, wherein positions of the one or more objects in the intermediate video frame are extrapolated from the different positions in the first video frame and the second video frame.

In some embodiments, there are at least 10 images in the sequence of images.

In some embodiments, there are 12-1.5 images in the sequence of images.

In some embodiments, each of the sequence of images has an exposure length of 12-16 seconds.

In some embodiments, the sequence of images is of a scene that includes a night sky containing celestial objects, wherein the video file depicts an animation of the celestial objects moving in the night sky.

In some embodiments, aligning the set of images within the sliding window comprises discarding images that fail alignment.

Figure 8:
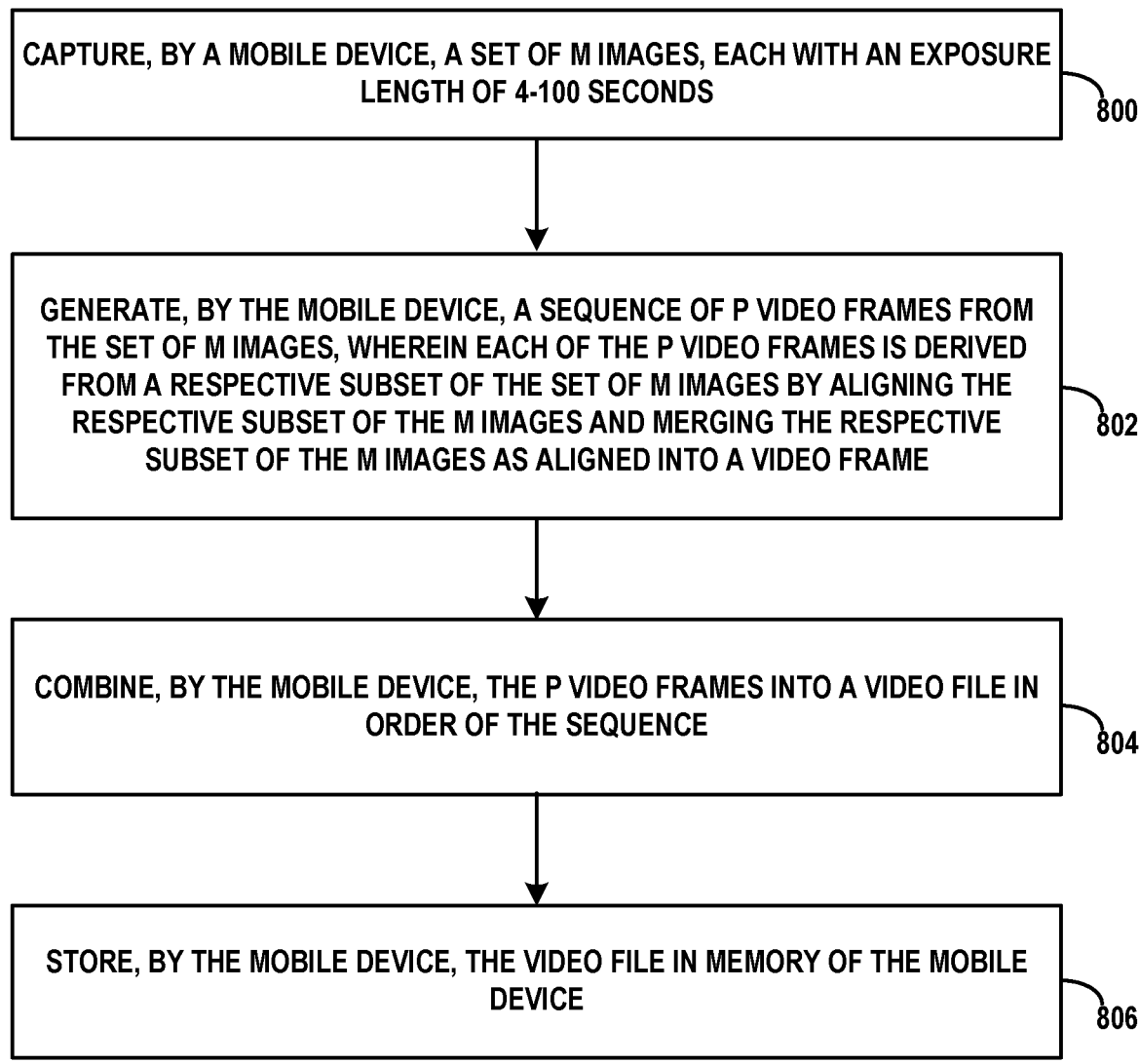
FIG. 8 is a flow chart, according to example embodiments.

FIG. 8 is a flow chart illustrating an example embodiment. This embodiment may be carried out by a computing device, such as digital camera device 100 as exemplified by computing device 200. However, one or more aspects of this embodiment can be carried out by other types of devices or device subsystems, such as a mobile device or other device containing or controlling a camera. Further, this embodiment may be combined with or may incorporate any aspect or feature disclosed in this specification or the accompanying drawings.

Block 800 may involve capturing, by a mobile device, a set of m images, each with an exposure length of 4-100 seconds. In various embodiments, exposure lengths of 6-30 seconds, 8-24 seconds, 12-20 seconds, or other values may be used.

Block 802 may involve generating, by the mobile device, a sequence of p video frames from the set of m images, wherein each of the p video frames is derived from a respective subset of the set of m images by aligning the respective subset of the in images and merging the respective subset of the m images as aligned into a video frame.

Block 804 may involve combining, by the mobile device, the p video frames into a video file in order of the sequence.

Block 806 may involve storing, by the mobile device, the video file in memory of the mobile device.

In some embodiments, the respective subset of the set of m images does not overlap with any other respective subset of the set of m images.

In some embodiments, the respective subset of the set of m images overlaps at least in part with another respective subset of the set of m images.

Some embodiments may further involve, prior to generating the sequence of p video frames, downsampling, by the mobile device, each of the set of m images by at least a factor of 2. In some embodiments, the downsampling and generating overlap at least in part with the capturing.

In some embodiments, capturing the set of in images comprises: (i) measuring a temperature of a camera component of the mobile device; (ii) determining that the temperature exceeds a predetermined threshold; and (iii) possibly in response to determining that the temperature exceeds the predetermined threshold, delaying capture of a subsequent image in the set of m images.

In some embodiments, the measuring takes place during or after capture of an nth image in the set of m images, and wherein the subsequent image is an (n+1)th image in the set of m images.

In some embodiments, delaying capture of the subsequent image comprises delaying capture of the subsequent image for a predetermined amount of time.

In some embodiments, delaying capture of the subsequent image comprises delaying capture of the subsequent image until the temperature no longer exceeds the predetermined threshold.

In some embodiments, wherein the camera component is an image sensor.

In some embodiments, combining the p video frames into the video file comprises: (i) identifying a first video frame and a second video frame that were sequentially generated; (ii) detecting one or more objects that have different positions in the first video frame and the second video frame, and (iii) generating an intermediate video frame that is temporally between the first video frame and the second video frame, wherein positions of the one or more objects in the intermediate video frame are extrapolated from the different positions in the first video frame and the second video frame.

In some embodiments, m is at least 4. In other embodiments, m is at least 8.

In some embodiments, the exposure length is 12-16 seconds.

In some embodiments, each of the set of in images is of a scene that includes a night sky containing celestial objects, and wherein the video file depicts an animation of the celestial objects moving in the night sky.

In some embodiments, aligning the respective subset of the set of m images comprises discarding images that fail alignment.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments, In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data), The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be, understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
   capturing, by a mobile device, a sequence of images, wherein there are 4 or more images in the sequence of images, and wherein each of the sequence of images has an exposure length of 4-100 seconds;

applying, by the mobile device, a sliding window over the sequence of images, wherein at least 4 images are encompassed within the sliding window, and wherein for each position of the sliding window the applying involves: (i) aligning a set of images within the sliding window, and (ii) merging the set of images as aligned into a video frame;

combining, by the mobile device, video frames generated by way of the sliding window into a video file, wherein the combining comprises:

identifying a first video frame and a second video frame that were sequentially generated:

detecting an object that has a first position in the first video frame and a second position in the second video frame, wherein the second position is different than the first position; and generating an intermediate video frame that is temporally between the first video frame and the second video frame, wherein a position of the object in the intermediate video frame is extrapolated based on the object moving along an arc between the first position in the first video frame and the second position in the second video frame; and storing, by the mobile device, the video file in memory of the mobile device.

2. The computer-implemented method of claim 1, further comprising:

prior to applying the sliding window, downsampling, by the mobile device, the sequence of images by at least a factor of 2.

3. The computer-implemented method of claim 2, wherein the downsampling and applying the sliding window overlap at least in part with the capturing.

4. The computer-implemented method claim 1, wherein capturing the sequence of images comprises:

measuring a temperature of a camera component of the mobile device;

determining that the temperature exceeds a predetermined threshold; and in response to determining that the temperature exceeds the predetermined threshold, delaying capture of a subsequent image in the sequence of images.

5. The computer-implemented method of claim 4, wherein the measuring takes place during or after capture of an nth image in the sequence of images, and wherein the subsequent image is an (n+1) th image in the sequence of images.

6. The computer-implemented method of claim 4, wherein delaying capture of the subsequent image comprises delaying capture of the subsequent image for a predetermined amount of time.

7. The computer-implemented method of claim 4, wherein delaying capture of the subsequent image comprises delaying capture of the subsequent image until the temperature no longer exceeds the predetermined threshold.

8. The computer-implemented method of claim 1, wherein applying the sliding window comprises:

measuring a temperature of a camera component of the mobile device;

determining that the temperature exceeds a predetermined threshold; and in response to determining that the temperature exceeds the predetermined threshold, delaying movement of the sliding window to a next position.

9. The computer-implemented method of claim 8, wherein delaying movement of the sliding window to the next position comprises delaying movement of the sliding window for a predetermined amount of time.

10. The computer-implemented method of claim 8, wherein delaying movement of the sliding window to the next position comprises delaying movement of the sliding window until the temperature no longer exceeds the predetermined threshold.

11. The computer-implemented method of claim 1, wherein there are at least 10 images in the sequence of images.

12. The computer-implemented method of claim 1, wherein the exposure length is 12-16 seconds.

13. The computer-implemented method of claim 1, wherein the object is a celestial object.

14. An article of manufacture including a non-transitory computer-readable medium, having stored thereon program instructions that, upon execution by an image capture device, cause the image capture device to perform operations comprising:

capturing a sequence of images, wherein there are 4 or more images in the sequence of images, and wherein each of the sequence of images has an exposure length of 4-100 seconds;

applying a sliding window over the sequence of images, wherein at least 4 images are encompassed within the sliding window, and wherein for each position of the sliding window the applying involves: (i) aligning a set of images within the sliding window, and (ii) merging the set of images as aligned into a video frame;

combining video frames generated by way of the sliding window into a video file, wherein the combining comprises:

identifying a first video frame and a second video frame that were sequentially generated:

detecting an object that has a first position in the first video frame and a second position in the second video frame, wherein the second position is different than the first position; and generating an intermediate video frame that is temporally between the first video frame and the second video frame, wherein a position of the object in the intermediate video frame is extrapolated based on the object moving along an arc between the first position in the first video frame and the second position in the second video frame; and storing the video file in memory of the mobile device.

15. A computer-implemented method comprising:

capturing, by a mobile device, a set of m images, each with an exposure length of 4-100 seconds;

generating, by the mobile device, a sequence of p video frames from the set of m images, wherein each of the p video frames is derived from a respective subset of the set of m images by aligning the respective subset of the m images and merging the respective subset of the m images as aligned into a video frame;

combining, by the mobile device, the p video frames into a video file in order of the sequence, wherein the combining comprises:

identifying a first video frame and a second video frame that were sequentially generated;

detecting an object that has a first position in the first video frame and a second position in the second video frame, wherein the second position is different than the first position: and generating an intermediate video frame that is temporally between the first video frame and the second video frame, wherein a position of the object in the intermediate video frame is extrapolated based on the object moving along an arc between the first position in the first video frame and the second position in the second video frame; and storing, by the mobile device, the video file in memory of the mobile device.

16. The computer-implemented method of claim 15, wherein capturing the set of m images comprises:

measuring a temperature of a camera component of the mobile device;

determining that the temperature exceeds a predetermined threshold; and in response to determining that the temperature exceeds the predetermined threshold, delaying capture of a subsequent image in the set of m images.

17. The computer-implemented method of claim 16, wherein the measuring takes place during or after capture of an nth image in the set of m images, and wherein the subsequent image is an (n+1)th image in the set of m images.

18. The computer-implemented method of claim 15, wherein m is at least 4.

19. The computer-implemented method of claim 15, wherein the exposure length is 12-16 seconds.

20. The computer-implemented method of claim 15, wherein the object is a celestial object.

* * * * *